No. 669,962. Patented Mar. 12, 1901.
H. F. SHAW.
STEERING MECHANISM FOR MOTOR VEHICLES.
(Application filed Dec. 24, 1900.)
(No Model.)
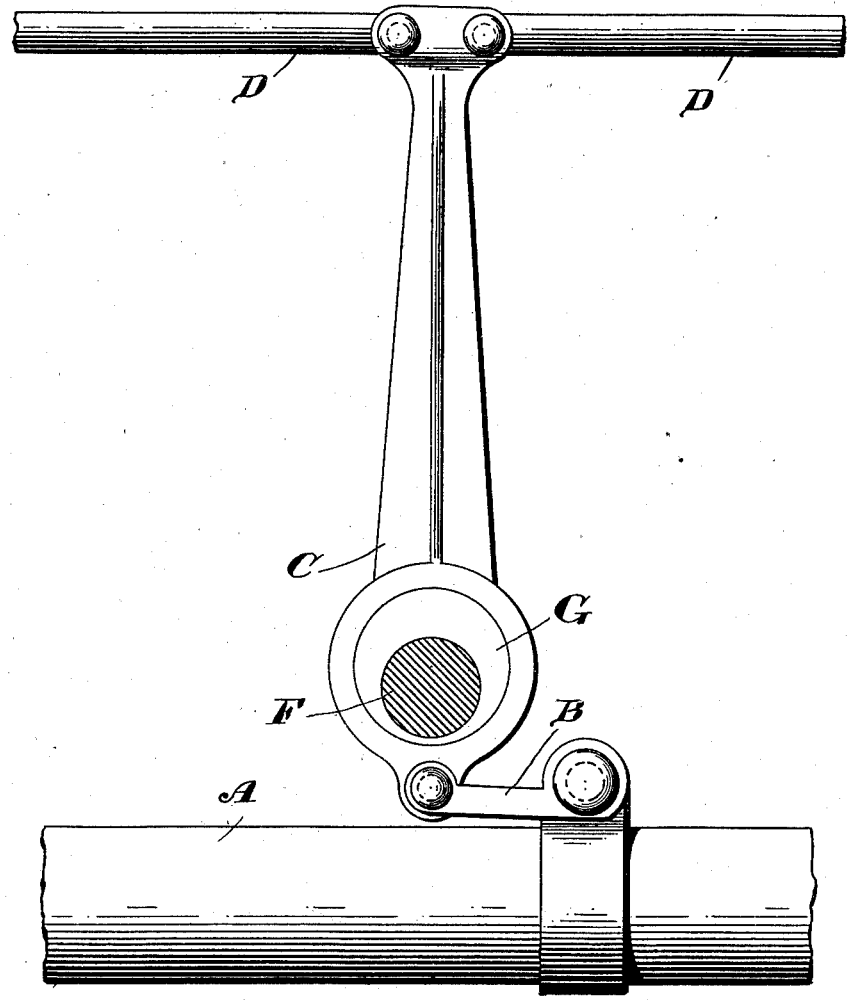
Witnesses
John Maupin.
Rosann Smith
Inventor
H. F. Shaw
per Richard Woods
Attorney

UNITED STATES PATENT OFFICE.

HENRY F. SHAW, OF WEST ROXBURY, MASSACHUSETTS, ASSIGNOR TO THE AUTOMOBILE STEERING COMPANY, OF JERSEY CITY, NEW JERSEY.

STEERING MECHANISM FOR MOTOR-VEHICLES.

SPECIFICATION forming part of Letters Patent No. 669,962, dated March 12, 1901.

Application filed December 24, 1900. Serial No. 41,011. (No model.)

*To all whom it may concern:*

Be it known that I, HENRY F. SHAW, a citizen of the United States, residing at West Roxbury, in the county of Suffolk and State of Massachusetts, have invented certain new and useful Improvements in Steering Mechanism; and I do hereby declare the following to be a full, clear, and exact description of the invention, such as will enable others skilled in the art to which it appertains to make and use the same.

My invention is an improved steering mechanism for motor-vehicles; and its objects are to provide means whereby the steering-gear of a motor-vehicle is made self-locking, so that the wheels cannot be made to deviate from their course should they come in contact with a stone or other obstructions even though the hand of the operator may be removed from the lever; to so construct the parts that there is no vibration conveyed to the hand-lever from the carriage-frame, and to so construct the parts that a rapid movement of the hand steering-lever will not impart such a rapid movement to the steering-wheels that the vehicle is likely to be upset or the wheels broken.

My invention consists in a link pivoted to the front of the vehicle, a shaft carrying an eccentric, with which shaft a hand steering-lever is connected, and a lever operated by the eccentric and fulcrumed at one end to the link, combined with connections to the stub-axles, as will be more fully described hereinafter.

In the accompanying drawing, representing a plan view of a steering mechanism which embodies my invention, A represents the front axle, to which or to any part of the vehicle is pivoted a short link B by means of a clip or other suitable device. This link is connected at its free end to one end of the lever C, which lever has a circular opening through it for eccentric G. The other end of the lever C is connected by means of the rods D to the stub-axles carrying the wheels.

The shaft F, with which the hand steering-lever is connected, carries eccentric G, which fits in the opening in the lever C, and by means of which shaft and eccentric the end of the lever C is moved from one side to the other and back and forth. The link B, being on a fixed pivot at one end and connected at the other end to the lever, allows the eccentric G when turned by the shaft F to freely move the lever back and forth and from side to side, and one end of this lever being connected to the inner ends of the two connecting-rods, as shown, the stub-axles and wheels are made to move, so as to guide the vehicle. The speed imparted through the lever C to the connecting-rods D diminishes as the eccentric G is turned either to the right or left from the position shown in the drawing.

In the steering mechanism heretofore used a rapid movement of the hand steering-lever imparts a rapid movement to the steering-wheel, and if the vehicle is running rapidly a sudden turn of the wheel at an angle to the body of the vehicle is not only liable to cause the vehicle to be upset, but to break or injure the wheels. In order to overcome this danger, I construct the parts, as shown, so that the wheels cannot be turned so rapidly as to affect the safety of the vehicle, but can be just as effectively moved. By means of the link B the lever is given a sufficient freedom of movement to control the steering movement of the wheels at all times, but which movement becomes slow in proportion as the eccentric G is turned either to the right or left, the first movement of the eccentric G causing the eccentric-lever C to operate the connecting-rods D more rapidly than at any other time, and hence a sudden movement of the hand steering-lever causes a gradual steering movement of the wheels, which is never sufficient to cause the vehicle to upset or injure the wheels in any manner.

Another advantage of my mechanism is that obstructions tending to deflect the steering-wheels are resisted by my steering mechanism—that is to say, the eccentric G and its shaft F are locked in all positions against all turning movements due to deflections of the steering-wheels.

What I claim as my invention is—

1. The steering mechanism above described comprising a lever with a movable fulcrum; an eccentric fitted in the lever; means to revolve the eccentric; and means to connect the free end of the lever with the steering-wheels.

2. In combination, a link with one fixed pivot, and with its free end forming a fulcrum for a lever; an eccentric fitted in that lever; that lever mounted on the eccentric; connections from the free end of that lever to the steering-wheels; and means to revolve the eccentric and thereby alter the position of the steering-wheels.

In testimony whereof I affix my signature in presence of two witnesses.

HENRY F. SHAW.

Witnesses:
ADAM COOK,
RICHARD WOODS.